United States Patent
Kasralikar

(10) Patent No.: US 7,835,348 B2
(45) Date of Patent: Nov. 16, 2010

(54) METHOD AND APPARATUS FOR DYNAMIC ANOMALY-BASED UPDATES TO TRAFFIC SELECTION POLICIES IN A SWITCH

(75) Inventor: Rahul S. Kasralikar, San Jose, CA (US)

(73) Assignee: Extreme Networks, Inc., Santa Clara, CA (US)

(*) Notice: Subject to any disclaimer, the term of this patent is extended or adjusted under 35 U.S.C. 154(b) by 898 days.

(21) Appl. No.: 11/648,064

(22) Filed: Dec. 30, 2006

(65) Prior Publication Data

US 2008/0163333 A1    Jul. 3, 2008

(51) Int. Cl.
H04L 12/26 (2006.01)
(52) U.S. Cl. .................................. 370/360; 726/24
(58) Field of Classification Search ............. 370/241
See application file for complete search history.

(56) References Cited

U.S. PATENT DOCUMENTS

| | | | |
|---|---|---|---|
| 6,754,832 B1* | 6/2004 | Godwin et al. ......... | 726/14 |
| 7,475,405 B2* | 1/2009 | Manganaris et al. ...... | 719/318 |
| 7,581,249 B2* | 8/2009 | Bussiere et al. ......... | 726/22 |
| 7,591,009 B2* | 9/2009 | Masuoka ............... | 726/11 |
| 2002/0133586 A1* | 9/2002 | Shanklin et al. ........ | 709/224 |
| 2004/0193943 A1* | 9/2004 | Angelino et al. ....... | 714/4 |
| 2006/0075093 A1* | 4/2006 | Frattura et al. ........ | 709/224 |
| 2007/0022090 A1* | 1/2007 | Graham ............... | 707/1 |

* cited by examiner

Primary Examiner—Ricky Ngo
Assistant Examiner—Ben H Liu
(74) Attorney, Agent, or Firm—Blakely Sokoloff Taylor & Zafman

(57) ABSTRACT

Techniques and architectures to dynamically modify policies used to determine how data in switched network traffic is selected for security inspection. One embodiment of the invention modifies policies used to determine how data in network traffic is redirected from a switch to an intrusion prevention system, without the policy modifications interrupting the handling of network traffic by the switch.

30 Claims, 4 Drawing Sheets

METHOD AND APPARATUS FOR DYNAMIC ANOMALY-BASED UPDATES TO TRAFFIC SELECTION POLICIES IN A SWITCH

BACKGROUND OF THE INVENTION

1. Field of the Invention

Embodiments of the invention relate generally to the switching of data in network traffic. More particularly, an embodiment of the invention dynamically updates policies used to determine how data received at a switch is to be selectively redirected for security threat inspection.

2. Background Art

The volume and variety of malware poses an ever-increasing threat to switched networking systems. Protection of switched networking systems is enhanced by intelligent network switches capable of collecting and evaluating data on incoming network traffic for modification of switching behavior. The benefits of intelligent switching are enhanced still further by leveraging intrusion prevention systems ("IPSs") to provide security services to a network switch without being physically in-line with a network traffic flow. "IPS" is understood in the networking arts to refer to a mechanism which may exercise access control to protect devices from security threats.

A network flow, also referred to herein as simply a "flow," is a sequence of network packets sharing certain characteristics. A common means of characterizing a flow is through use of an "n-tuple," where n is some number. For example, a 5-tuple is a common way for distinguishing the packets in a given flow based on the common source and destination address, source and destination port, and protocol (5 values total, hence the "5-tuple" label.) Other combinations of flow characteristics may also be used in defining a network flow.

A "tiered service" (also referred to herein as a "network service" or, simply, a "service") is a term used to indicate a type of network traffic (e.g., mail traffic, web traffic, Structured Query Language (SQL) traffic, etc.). Typically, these different types of traffic, or services, communicate using standard port numbers. For example, the standard port number for Simple Mail Transfer Protocol (SMTP) traffic is port 25, using Transmission Control Protocol (TCP) or User Datagram Protocol (UDP). As another example, the standard TCP/UDP port number for File Transfer Protocol (FTP) traffic is port 21. In addition to using a port number, services can be identified based on other characteristics other such as source or destination address, protocol or combinations of port numbers, source and destination addresses, and/or protocol.

Network switches and/or other network devices can filter, redirect, block, and/or forward network traffic based on the traffic's type of service. For example, a switch may be configured to redirect a particular type of traffic, such as mail traffic, to an external device such as an IPS for inspection. In the context of network switching, tiered services are often implemented statically using fixed user configurations. As used herein, "implementing a service" refers to adding or deleting a service in a table, list, etc. of services that is referenced to determine whether to take an action (e.g., blocking, forwarding, redirecting, etc.) on packets flowing through a switch or network device. Methods exist to modify such a table or list of services dynamically—i.e. without the need a network administrator or other authority to perform these tasks manually. One example of such a method makes these dynamic modifications based on the volume of traffic in a switch (and/or the rate of change in said volume) which is being filtered, redirected, blocked, etc.

However, these modifications are often determined in reference to a set of policies which are themselves static and require manual configuration—e.g. by a network administrator. Static system security policies do not take into account changing network conditions. When network conditions change, an administrator may want to add, delete or modify a system security policy in response to the changed conditions. Manual addition/deletion of system security policy can be burdensome to an administrator and contributes to delays in reacting to the changing network conditions.

SUMMARY OF THE INVENTION

An embodiment of the invention allows a network switch to adaptively modify policies to be used in identifying network traffic which is to be selectively redirected for inspection by one or more security services. This inspection may be provided, for example, by redirecting data corresponding to the identified data characteristic (e.g. flow type, service type, etc.) to the security services of an intrusion prevention system (IPS). References to "flows" and/or "services" herein are used for illustrative purposes, while various embodiments of the invention are understood to extend to other data characteristics. In one embodiment of the invention, the flows and/or services to be redirected may be identified as entries in a table, list, database or similar data structure which is accessible to a mechanism for redirecting flows and/or services matching those entries.

The data structure identifying flows and/or services of interest may be modified based at least in part on a set of one or more traffic selection policies. According to one embodiment of the invention, the set of one or more policies may be updated while the switch remains in operation, based at least in part on information regarding known network conditions. This information may be provided to the switch from any of a variety of sources, including but not limited to: feedback from a security services agent inspecting the redirected traffic of the switch, messages from agents providing security services for traffic external to the switch, messages from security detection and/or enforcement mechanisms internal to the switch, and/or input from a network administrator. In response to network conditions, an embodiment of the invention may—without interrupting ability of the switch to handle received network traffic—add, delete or otherwise change policies used to identify which flows and/or services in said network traffic are to undergo further packet inspection.

DESCRIPTION OF THE DRAWINGS

The various embodiments of the present invention are illustrated by way of example, and not by way of limitation, in the figures of the accompanying drawings and in which.

DETAILED DESCRIPTION

Figure 1:
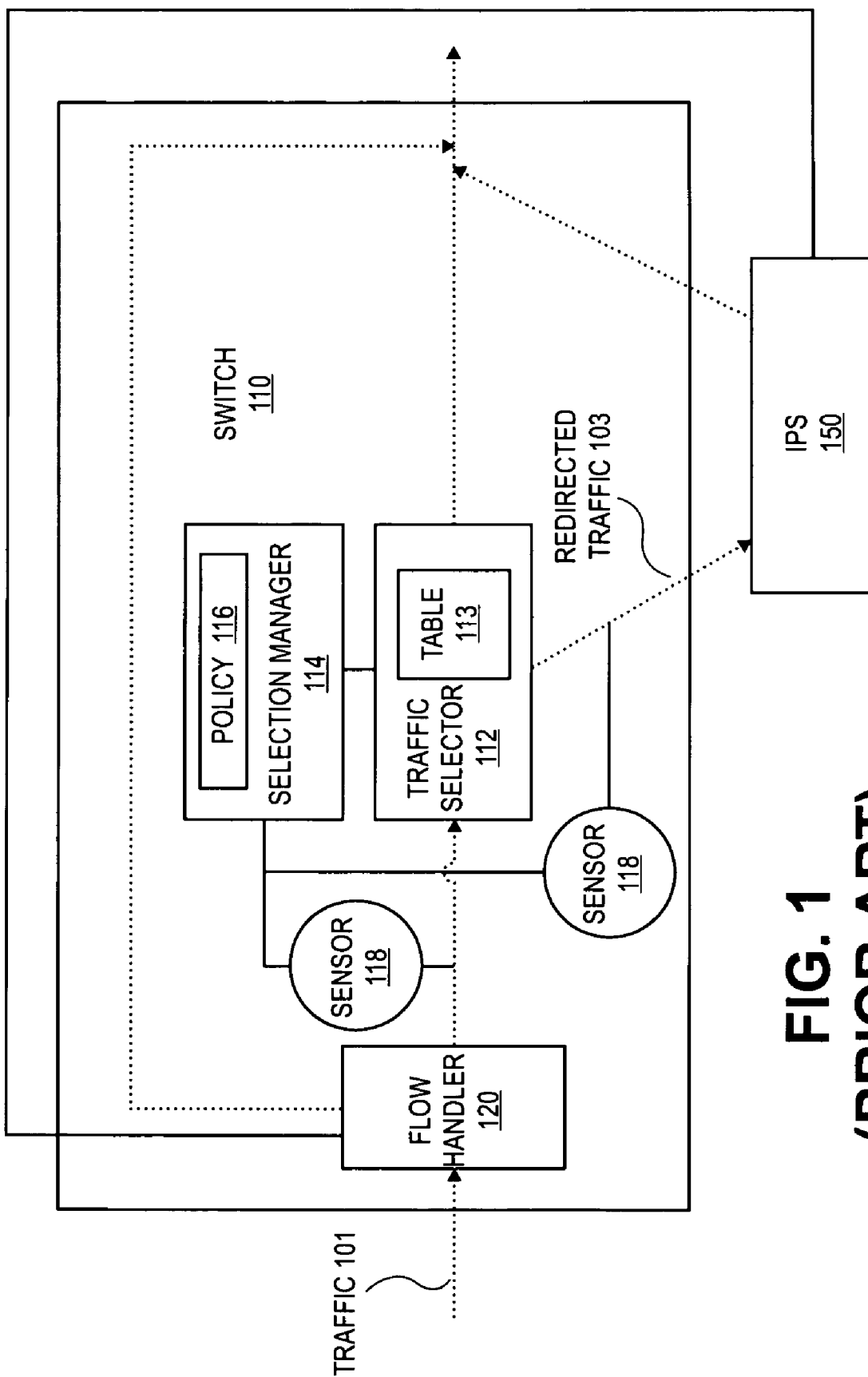
FIG. 1 is a block diagram illustrating a prior art configuration of a network switch and an IPS device.

FIG. 1 illustrates a combination of a switch 110 and an intrusion prevention system (IPS) which is configured to selectively switch network traffic 101 according to the prior art. Switch 110 receives traffic 101 (i.e., packet traffic/flows). Flow handler 120 identifies flows that have previously been analyzed and determined by the IPS 150 to be safe for the network. These flows are forwarded directly through switch 110 without further interruption. The remaining traffic is sent to traffic selector 112.

Traffic selector 112 identifies flows for redirection to IPS 150 on a per flow basis or a per-service (e.g., email, web, SQL, FTP, etc.) basis. Traffic selector 112 includes a table, 113, having entries that identify flows and/or services that have been flagged for further packet inspection. In other words, traffic associated with a service that matches an entry in table 113 is redirected to IPS 150. Table 113 is implemented in a cache or memory (e.g., random access memory (RAM), read-only memory (ROM), flash memory, etc.). For example, table 113 may be implemented in a content addressable memory (CAM) or in a ternary CAM (TCAM).

IPS 150 analyzes redirected traffic 103 to determine whether a particular flow is good (e.g., safe, not a threat, etc.) or bad (e.g., viruses, worms, denial of service (DoS) attacks, etc.). These determinations are communicated back to flow handler 120 to provide a basis for future post-analysis forwarding decisions. For example, an IPS device might determine that a particular flow (e.g., flow A) is a good flow. The IPS sends to flow handler 120 a notice identifying flow A as a good flow. The switch stores a flow identifier (e.g., a 5-tuple) for flow A in a memory. Thus, once a flow identifier for flow A is stored in the memory, any subsequently received packets associated with flow A will generate a match with the flow A identifier in memory, causing the switch to forward the flow A packets through the switch without passing them through traffic selector 112 or redirecting them to IPS 150.

For flows/traffic/packets that are passed from flow handler 120 to traffic selector 112, table 113 identifies services and/or flows that have been flagged for vulnerability inspection. The entries in table 113 are dynamically/automatically updated based on internal switch traffic conditions detected by sensors 118. Switch 110 may include a first sensor to monitor traffic passed from flow handler 120 to traffic selector 112 and a second sensor to monitor traffic between traffic selector 112 and IPS 150.

Sensors 118 collect various packet statistics such as cumulative packet counts for one or more flows, a change or delta in a packet count over a time interval, a ratio of two cumulative packet counts, and/or a ratio of a change or delta in two different packet counts over a time interval. Given that services (e.g., email, SQL, FTP, etc.) typically communicate using a standard port number, sensors can also track packet counts, deltas, and ratios based on service type. Sensors 118 may also collect statistics for reverse/outbound traffic associated with a flow. For example, the sensors may track the number of incoming Transmission Control Protocol (TCP) synchronize (SYN) packets received for a particular flow. Meanwhile, the sensors can also track the number of outbound TCP SYN-acknowledge (SYN-ACK) packets associated with the flow.

Sensors 118 report detected conditions to a selection manager 114. Selection manager 114 includes a policy 116. Detected conditions (e.g., a spike in traffic, traffic congestion, etc.) are analyzed using the rules and/or thresholds of policy 116 to determine whether a service or flow associated with a detected condition warrants further inspection by IPS 150. Sensors 118 may, for example, detect an abnormal increase in email traffic entering switch 110. If the abnormality triggers a rule or exceeds a threshold of policy 116, then selection manager 114 will automatically update table 113 to include email traffic. Thus, any subsequent email traffic received by traffic selector 112 is redirected to IPS 150 for vulnerability detection. In another example, sensors 118 may detect congestion in redirected traffic 103 due to the limited bandwidth of IPS 150. In this case, selection manager 114 automatically modifies table 113 by removing one or more services as needed to reduce the redirected traffic 103 flowing to IPS 150.

As discussed above, selection manager 114 dynamically modifies table 113 based on policy 116. It should be noted that while policy 116 dictates the dynamic modifications made by selection manager 114, the policy itself may also be modified. From time to time, the demands/needs/objectives of a network and/or network device may change. When these changes occur, it may be desirable to modify policy 116 to better suit the changing needs of the network. To date, modification of policies used by selection manager 114 has required manual configuration by a network administrator. An embodiment of the invention provides for the updating of traffic selection policies such as policy 116 dynamically—i.e. without interrupting the handling of network traffic by a switch.

Figure 2:
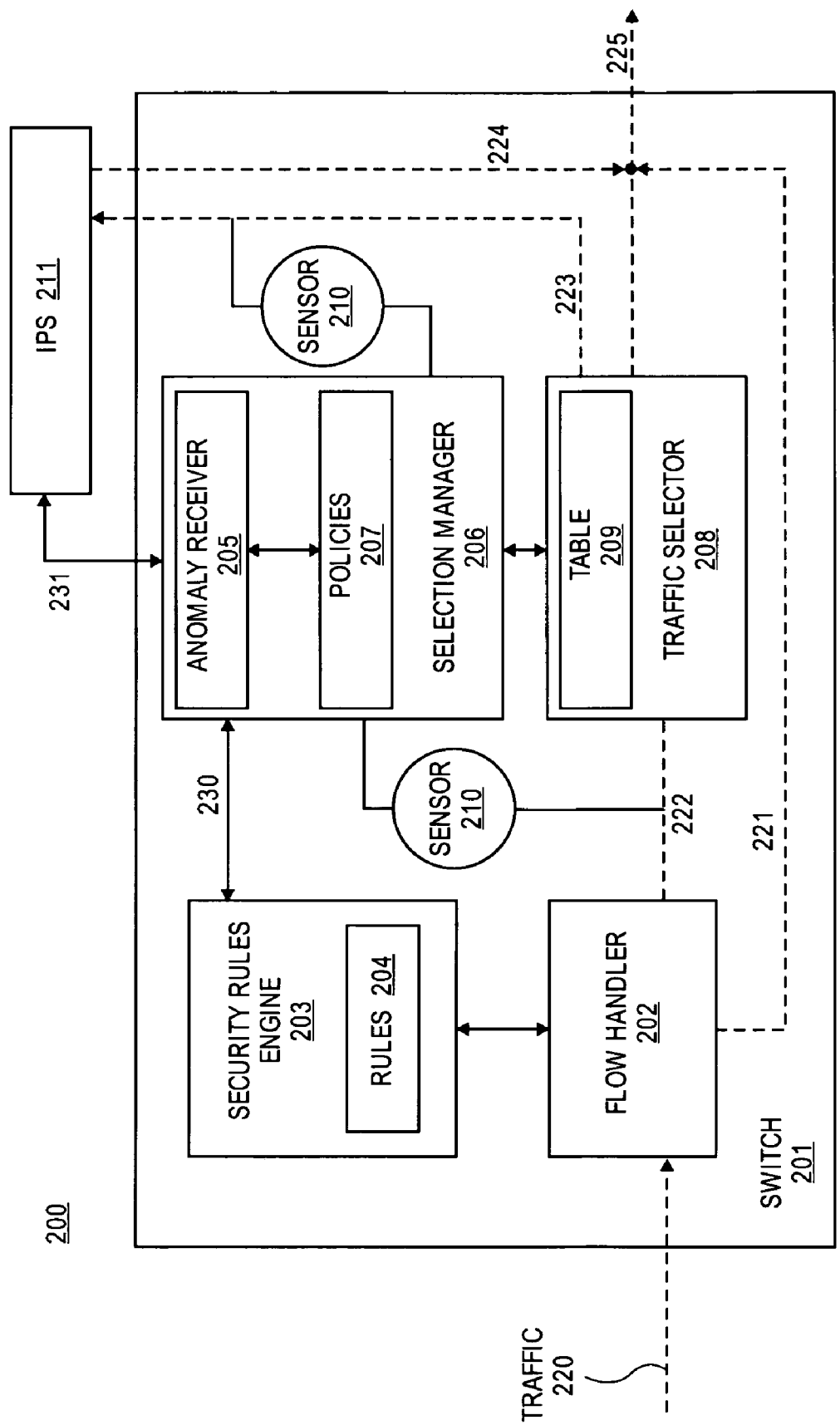
FIG. 2 is a block diagram illustrating a network switch and an IPS device configured to dynamically modify traffic selection policies according to an embodiment of the invention.

FIG. 2 illustrates a configuration 200 to implement one embodiment of the invention. For illustrative purposes, configuration 200 shows additional features over those of FIG. 1. It should be noted that other embodiments of the invention may have other configurations not related to those show in either of FIG. 1 or 2. One embodiment of the invention may be implemented by a switching device which can selectively redirect network traffic for inspection by one or more security services, where the redirecting is based on some list of data characteristic identifiers subject to modification according to a set of one or more policies. According to configuration 200, switch 201 may receive traffic 220 at flow handler 202 (e.g. via a port, bus connection or other interface), which identifies flows that have previously been analyzed and determined by the IPS 211 to be safe for the network. These flows are forwarded directly through switch 201 without further interruption. The remaining traffic 222 is sent to traffic selector 208. Traffic selector 208 may identify flows for redirection to IPS 211 on a per flow basis or a per-service (e.g., email, web, SQL, FTP, etc.) basis. The IPS may receive redirected data 223, for example, via any of a coaxial cable, a twisted pair cable, a parallel bus, a serial bus, etc. Traffic selector 208 may include a table 209 having entries that identify flows and/or services that have been flagged for further packet inspection (discussed in detail below). In other words, traffic associated with a service that matches an entry in table 209 may be redirected to IPS 211. Table 209 may be implemented in a cache or memory. In one embodiment, table 209 is implemented in a content addressable memory (CAM). In another embodiment, a ternary CAM, or TCAM, is used to implement the table.

IPS 211 may analyze redirected traffic 223 to determine whether a particular flow is good (e.g., safe, not a threat, etc.) or bad (e.g., viruses, worms, denial of service (DoS) attacks, etc.). For example, an IPS device might determine that a particular flow (e.g., flow B) is a good flow. Data from good flows 224 may be returned to outbound network traffic 225 being switched by switch 201. The IPS 211 may send a notification to flow handler 202 identifying flow B as a good flow. The switch 201 may store a flow identifier (e.g., a 5-tuple) for flow B in a memory. Thus, once a flow identifier for flow B is stored in the memory, any subsequently received packets associated with flow B may generate a match in flow handler 202 with the flow B identifier in memory, which may cause the switch 201 to forward the flow B packets, at 221, through the switch 201, at 225, without passing them through traffic selector 208 or redirecting them to IPS 211.

For data which is passed from flow handler 202 to traffic selector 208, table 209 is used to identify services and/or flows of the data and compare them services and/or flows that have been flagged for vulnerability inspection. The entries in table 209 may be dynamically/automatically updated based on current network conditions. Network conditions may be detected by sensors 210. In one embodiment, switch 201 may include a first sensor 210 to monitor traffic passed from flow handler 202 to traffic selector 208 and a second sensor 210 to monitor traffic between traffic selector 208 and IPS 211. In other embodiments, switch 201 can include any combination of one or more sensors at various locations within the switch 201 to monitor traffic and detect conditions.

Sensors 210 may collect various packet statistics such as cumulative packet counts for one or more flows, a change or delta in a packet count over a time interval, a ratio of two cumulative packet counts, and/or a ratio of a change or delta in two different packet counts over a time interval. Given that services (e.g., email, SQL, FTP, etc.) typically communicate using a standard port number, sensors can also track packet counts, deltas, and ratios based on service type. Sensors 210 may also collect statistics for reverse/outbound traffic associated with a flow. For example, in one embodiment, the sensors track the number of incoming Transmission Control Protocol (TCP) synchronize (SYN) packets received for a particular flow. Meanwhile, the sensors can also track the number of outbound TCP SYN-acknowledge (SYN-ACK) packets associated with the flow.

Sensors 210 may report detected conditions to a selection manager 206. Selection manager 206 includes a set of one or more policies 207. This set of policies 207 may be implemented as a policy database. Detected conditions (e.g., a spike in traffic, traffic congestion, etc.) are analyzed using the rules and/or thresholds of the set of policies 207 to determine whether a service or flow associated with a detected condition warrants further inspection by IPS 211. In one embodiment, sensors 210 may detect an abnormal increase in email traffic entering switch 201. If the abnormality triggers a rule or exceeds a threshold of one of the set of policies 207, then selection manager 206 may automatically update table 209 to include email traffic. Thus, any subsequent email traffic received by traffic selector 208 may be redirected to IPS 211 for vulnerability detection. In another embodiment, sensors 210 may detect congestion in redirected traffic 223 due to the limited bandwidth of IPS 211. In this case, selection manager 206 may automatically modify table 209 by removing one or more services as needed to reduce the redirected traffic 223 flowing to IPS 211.

To allow dynamic updates to traffic selection policies 207 without requiring manual configuration and/or an interruption to the performance of switch 201, an embodiment of the invention may include anomaly receiver 205 to receive and process anomaly detection information for use by switch 201. As used herein, "anomaly detection" is understood to refer to any of a variety of analytical methods, well known in the networking arts, which are performed to determine potential security risks to a network. Anomaly detection information may be generated from analysis of the contents of a single data packet, for example, and/or from analysis of patterns across numerous data packets, flows, services, etc. over time. For example, anomaly detection information of the type received at anomaly receiver 205 may include, but is not limited to: malware descriptions, signature-based intrusion detection data, profile-based intrusion detection data, traffic pattern matching data, stateful traffic pattern matching data, protocol decode-based analysis data, heuristic-based analysis data, etc.

It should be noted that anomaly detection information such as that received at anomaly receiver 205 may, in various embodiments, be used to generate actions to be communicated to mechanisms handling data in network traffic—e.g. traffic selector 208, security rules engine 203 and/or IPS 211. In the example of FIG. 2, selection manager 206 may, based on received anomaly detection information, generate any of a variety of such actions and/or various corresponding conditions under which said actions may be performed. One example of a condition which may used to determine whether and/or how a data handling actions may be taken is the state of a given alert level. For example, one of the mechanisms in switch 201 such as traffic selector 208 may store or otherwise have access to an alert level (not shown) indicating an existing security threat to at least part of configuration 200. In determining an action to take in handling received traffic 222, traffic selector 208 may compare this alert level to the conditions provided by selection manager 206. Such actions and/or conditions may be selectively communicated to the mechanisms handling data in network traffic, for example via connection 231 and/or connection 230. Connection 231 may be, for example, any of a coaxial cable, a twisted pair cable, a parallel bus, a serial bus, etc.

Anomaly detection information to be received at anomaly receiver 205 may originate from any of a variety of sources, a selection of which is shown by way of illustration in FIG. 2. First, FIG. 2 shows IPS 211 providing anomaly detection information to anomaly receiver 205—in this case via a connection 231 to selection manager 206. Second, switch 201 is shown to include a security rules engine 203, coupled to flow handler 202, which may provide anomaly detection information to anomaly receiver 205—in this case via a connection 230 to selection manager 205. Security rules engine 203 may, for example, be a module to analyze traffic 220 and provide first-order threat detection and mitigation at flow handler 202 by deriving and/or enforcing a set of security rules 204 based on said traffic analysis. An example of such a security rules engine 203 is the Extreme Networks® CLEAR-Flow Security Rules Engine, which may determine whether to filter, redirect, block, and/or forward services and/or flows based on network traffic analysis and security rules such as rules 204. Furthermore, a security rules engine 203 such as a CLEAR-Flow Security Rules Engine may also relay to anomaly receiver 205 any anomaly detection information resulting from this network traffic analysis. Third, the information provided by various sensors 210 internal to switch 201 may be received by anomaly receiver 205. Still other sources of anomaly detection information—not shown in FIG. 2—may include security detection and/or mitigation agents operating on network traffic which is external to switch 201.

A source of anomaly detection information may communicate with anomaly receiver 205 by a variety of means including, but not limited to: polling by anomaly receiver 205, sending of a recognized interrupt by the source of the anomaly detection information, and/or an agreed-upon data communication protocol. Upon receipt by anomaly receiver 205, anomaly detection information may be processed and communicated to selection manager 206 for use in updating policies 207 and/or table 209. In one embodiment of the invention, policies 207 may be updated dynamically without having to reboot some part of a data processing system in switch 201. This may be achieved, for example, by implementing at least some of the functions of selection manager 206 as one or more independent components of a modular operating system. By using a modular operating system or similar technology to isolate the runtime operation of certain components of configuration 200, these components may be updated in real time without interrupting the handling of received network traffic 220 by switch 201. One example of such a modular approach is to implement at least part of the selection manager as a module of an Extreme Networks® ExtremeXOS™ modular operating system.

Figure 3:
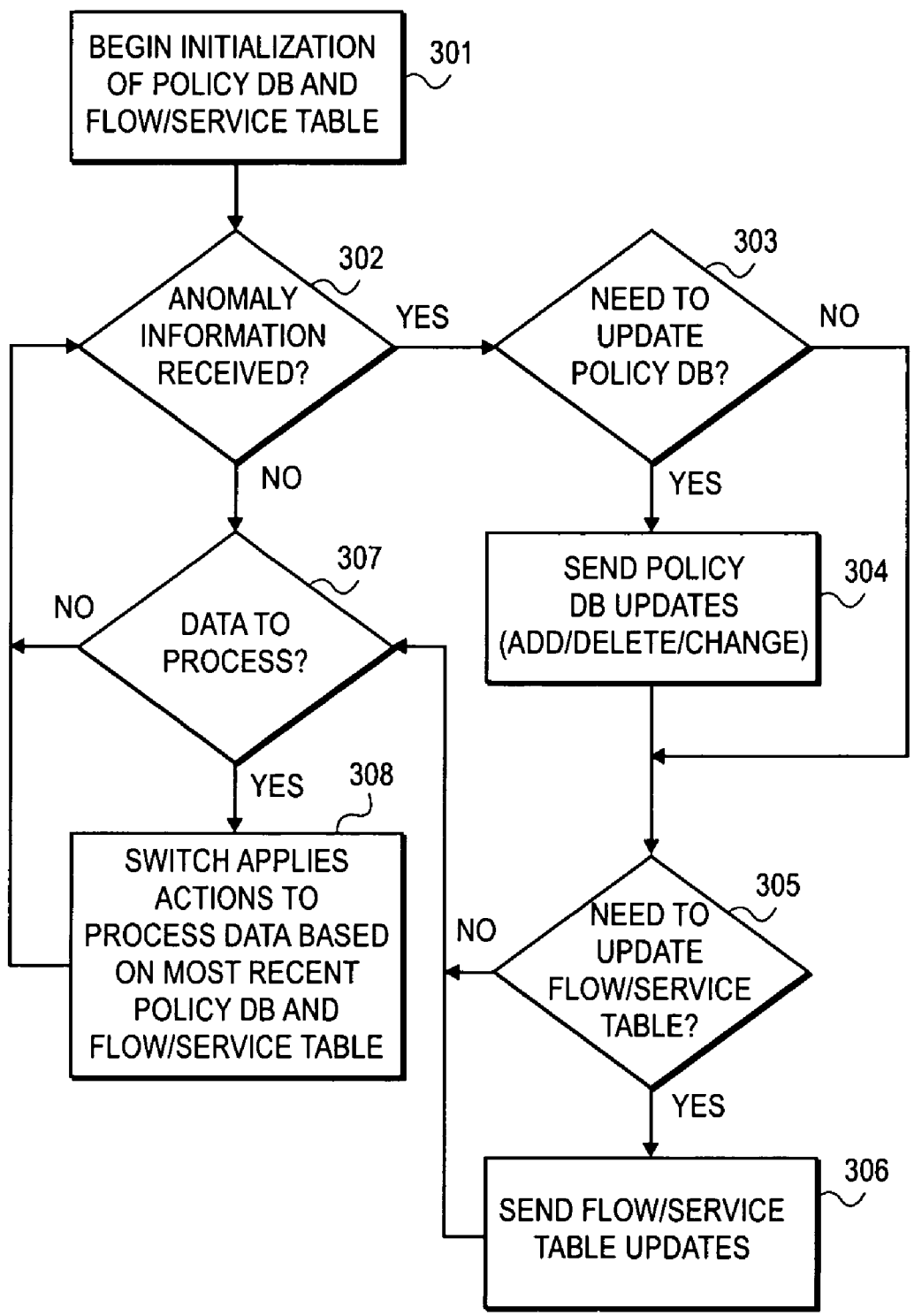
FIG. 3 is a flow diagram illustrating a method of adaptively switching network traffic according to an embodiment of the invention.

FIG. 3 shows a flow diagram 300 illustrating an algorithm to adaptively switch network traffic according to one embodiment of the invention. This flow diagram may represent a sequence of operations to be performed, for example, by a system such as the above-described configuration 200 of FIG. 2. Although applicable to other switch/IPS configurations, for illustrative purposes, the flow diagram 300 will be described herein in the context of configuration 200.

According to the algorithm, the switch 201 may first go through an initialization process, at 301. In the course of initialization, the switch 201 may setup policies 207 (e.g. as a policy database) for selection manager 206, to be used in determining how entries in table 209 of traffic selector 208 are to be modified. Furthermore, initialization of switch 201 may include initialization of table 209 itself, which may include providing table 209 with flow and/or service identifiers to be used in selectively directing network traffic to IPS 211 for identification of security threats. At least part of the system initialization and configuration of policies 207 and table 209 may be performed manually—for example, by a network administrator.

After initialization, at 302, the anomaly receiver 205 may receive anomaly detection information to be used in determining whether the initial configuration of the switch 201 needs further modification. As discussed above, this information may be based on anomaly detection from within switch 201, or alternatively, on anomaly detection resulting from analysis of network traffic which is external to switch 201. If no anomaly detection information is received, at 307, the system may handle data in the received traffic 220 according to the unchanged selection policies 207 and traffic selection table entries 209. Where anomaly detection information has been received, selection manager 206 may, at 303, determine whether policies 207 need to be modified. In no updates are required, based on the received anomaly detection information, the updates to table 209 may continue, at 305.

If updates are needed, at 304, any changes to policies 207 (e.g. adding policies, deleting policies, changing policies), are performed dynamically—i.e. without interruption to the handling of network traffic by switch 201. The dynamic updating of policies 304 may be achieved by isolating the execution of at least part of selection manager 206 from other runtime operations of switch 201. Such isolation may be achieved via a modular operating system, which allows part of selection manager 206 to reboot and/or reconfigure without any interruption to network traffic 220 being handled by switch 201.

After the set of one or more policies 207 are updated, selection manager 206 may update table 209 based on any updates policies, at 305. At 305, the data structure 209 (e.g. table, list, database etc.), which identifies flows and/or services to be redirected for security threat inspection, may need to be updated. If the policy changes at 304 result in a need to update table 209 (e.g. by adding, deleting and/or changing one or more flow and/or service entries), those updates take place, at 306. Otherwise, the handling of data in the network flow by switch 201 takes place using the most recent updates to selection policies 207 and traffic selector table 209. In particular, at 307 the switch looks for incoming traffic data to process by determining appropriate switching actions based on conditions including existing alert levels, the nature of the incoming data and on existing policies 207 and entries in table 209. If, at 307, switch 201 receives incoming network traffic 220, the switch 201 can, at 308, apply actions to process data in the received traffic 220, the actions based on the most recent status of policies 207 and entries in table 209. These actions may, for example, filter, redirect, block, and/or forward data in network traffic 220 based on the traffic's type of service. Other actions taken by switch 201 may include, but are not limited to: mirroring data to a security monitoring device, setting or changing volume and/or delta limits for traffic in switch 201 (e.g. via a quality of service (QoS)), establishing a honeypot to trap or detect security threats, etc. If switch 201 does not receive incoming network traffic 220, or any received traffic has been acted upon at 308, the algorithm returns to 302—i.e. looking for any anomaly detection information to act on, as described above.

Figure 4:
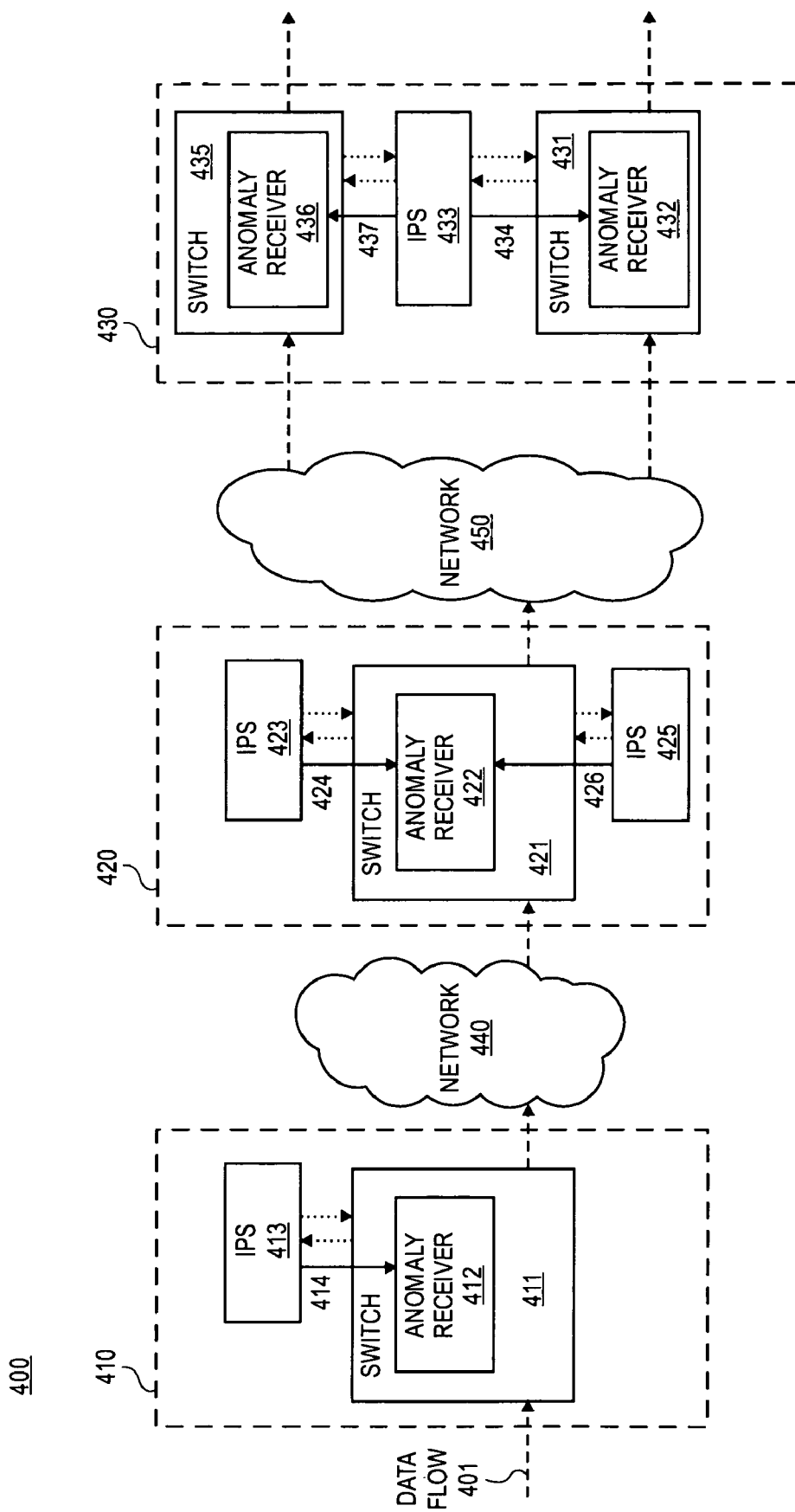
FIG. 4 is a block diagram illustrating different configurations for dynamically updating traffic selection policies according to various embodiments of the invention.

FIG. 4 illustrates a set 400 of different configurations 410, 420 and 430, each to dynamically update traffic selection policies according to various embodiments of the invention. Networks 440 and 450 are shown as separating each of configurations 410, 420 and 430 to illustrate that each may be a distinct embodiment of the invention. Configurations 410, 420 and 430 are each illustrative of select embodiments of the invention. Alternate embodiments may include various combinations of configurations 410, 420 and/or 430, or include different configurations not shown in FIG. 4.

Configuration 410 shows a switch 411 which has an anomaly receiver 412 and receives network data flow 401 for selective switching to network 440. Switch 411 may access a corresponding set of stored entries (not shown) which identify services, flows or other characteristics of data in network traffic which are to be redirected for further security inspection. In this example, switch 411 may redirect data in data flow 401 for inspection by the security services of IPS 413, where the redirected data corresponds to one or more of the stored entries. The stored entries may be modified based on a corresponding set of one or more policies (not shown) also accessible to switch 411. In this example, switch 411 receives anomaly detection information to determine updates to its corresponding set of one or more security policies. These updates may occur dynamically—i.e. without interrupting the ability of switch 411 to direct or otherwise act on received data flow 411. This dynamic updating of security policies may be achieved, for example, by implementing a modular operating system such as Extreme Networks® ExtremeXOS™ on switch 411. A modular operating system approach allows components of switch 411 to reboot and/or reconfigure without having to interrupt the operation of other components of switch 411.

For simplicity of explanation, anomaly detection information to anomaly receiver 412 is represented by feedback 414 from IPS 413, although a variety of other sources internal and external to switch 411 may provide such information. Anomaly detection is well known in the networking arts, and is omitted from the discussion of FIG. 4 for brevity. Anomaly receiver 412 may receive and prepare anomaly detection information 414 for use by switch 411 in determining any updates (e.g. additions, deletions, modifications, etc.) to the corresponding set of one or more security policies, and/or any actions and conditions to handle network data according to methods described herein. Based on any such updates, the switch may adaptively change the manner of redirecting data in data flow 401 based on the latest corresponding set of stored entries.

Configuration 420 shows a switch 421 which has an anomaly receiver 422 and also receives network data flow for selective switching to network 450. Switch 421 may access a corresponding set of stored entries (not shown) which identify services, flows or other classifications of data in network traffic which is to be redirected for further security inspection. In this example, switch 421 may redirect data in data flow 401 for inspection by the security services of one or both of IPS 423 and IPS 425, where the redirected data corresponds to one or more of the stored entries. The stored entries may be modified based on a corresponding set of one or more security policies (not shown) also accessible to switch 421. In this example, switch 421 receives anomaly detection information to determine updates to its corresponding set of one or more security policies. These updates may occur dynamically—i.e. without interrupting the ability of switch 421 to direct or otherwise act on received data flow 421. This dynamic updating of security policies may be achieved, for example, by implementing a modular operating system on switch 421, as discussed above. A modular operating system approach allows components of switch 421 to reboot and/or reconfigure without having to interrupt the operation of other components of switch 421.

For simplicity of explanation, anomaly detection information to anomaly receiver 422 is represented by feedback 424 from IPS 423 and by feedback 426 from IPS 425, although a variety of other sources internal and external to switch 421 may provide such information. Anomaly receiver 422 may receive and prepare anomaly detection information 424 and/or 426 for use by switch 421 in determining any updates (e.g. additions, deletions, modifications, etc.) to the corresponding set of one or more security policies, and/or any actions and conditions to handle network data according to methods described herein. Based on any such updates, the switch may adaptively change the manner of redirecting data in data flow 401 based on the latest corresponding set of stored entries.

Configuration 430 shows switches 431 and 435 which have anomaly receivers 432 and 436, respectively, and which each receive a corresponding network data flow for selective switching. Each of switches 431 and 435 may access a corresponding set of stored entries (not shown) which identify services, flows or other classifications of data in network traffic which is to be redirected for further security inspection. In this example, each of switches 431 and 435 may redirect data in its corresponding data flow for inspection by the security services of shared IPS 433, where the redirected data corresponds to one or more of the corresponding stored entries. The stored entries may be modified based on a corresponding set of one or more policies (not shown), each accessible to its corresponding switch. In this example, switches 431 and 435 each receive anomaly detection information to determine updates to its corresponding set of one or more security policies. These updates may occur dynamically—i.e. without interrupting the ability of switch 431 or switch 435 to direct or otherwise act on a corresponding received data flow. This dynamic updating of security policies may be achieved, for example, by implementing a modular operating system such as Extreme Networks® ExtremeXOS™ on either or both of switches 431 and 435. A modular operating system approach allows components of either or both of switches 431 and 435 to reboot and/or reconfigure without having to interrupt the operation of other components of these switches.

For simplicity of explanation, anomaly detection information to each of anomaly receivers 432 and 436 is represented by feedback 434 and 437, respectively, from IPS 433, although a variety of other sources internal and external to switches 431 and 435 may provide such information. Anomaly receivers 432 and 436 may receive and prepare anomaly detection information 434 and 435, respectively, for use by switches 431 and 435, respectively, in determining any updates (e.g. additions, deletions, modifications, etc.) to each corresponding set of one or more security policies, and/or any actions and conditions to handle network data according to methods described herein. Based on any such updates, the switches 431 and 435 may each adaptively change the manner of redirecting data in the corresponding data flow based on the latest corresponding set of stored entries.

Techniques and architectures for dynamically updating traffic selection policies in a switch are described herein. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the networking arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

What is claimed is:

1. A method comprising:
    receiving network traffic which is subject to a selective switching;
    storing a set of one or more traffic selectors, each traffic selector in the set of one or more traffic selectors indicating a respective data flow;
    evaluating a set of data in the received network traffic based on a first traffic selector in the set of one or more traffic selectors, the evaluating to determine whether the set of data is to be inspected by a security service agent;
    in response to the evaluating, redirecting the set of data in the received network traffic to the security service agent;
    detecting that a network condition exceeds a threshold of a set of one or more policies;
    in response to the detecting, triggering an update of the set of one or more traffic selectors;
    receiving anomaly detection information; and
    based on the received anomaly detection information, modifying in the set of one or more policies a first policy according to which the set of one or more traffic selectors is to be updated, the modifying without interrupting the selective switching of the network traffic.

2. The method of claim 1, wherein the set of one or more traffic selectors includes at least one of an identifier of a data service and an identifier of a data flow.

3. The method of claim 1, wherein the anomaly detection information is received from an agent other than the security service agent.

4. The method of claim 1, wherein the security service agent is an intrusion prevention system.

5. The method of claim 4, wherein the anomaly detection information is received from the intrusion prevention system.

6. The method of claim 1, further comprising analyzing a received traffic flow via a security rules engine, and wherein the anomaly detection information is received from the security rules engine.

7. The method of claim 1, wherein the anomaly detection information is received via a data communication protocol.

8. The method of claim 1, wherein modifying the set of one or more policies includes rebooting a component of a modular operating system.

9. A apparatus comprising:
    a switch having
        an interface to receive network traffic which is subject to a selective switching,
        a memory to store a set of one or more traffic selectors, each traffic selector in the set of traffic selectors indicating a respective data flow,
        traffic selection logic to evaluate a set of data in the received network traffic based on a first traffic selector in the set of traffic selectors, the evaluating to determine whether the set of data is to be inspected by a security service agent, the traffic selection logic further to redirect the set of data in the received network traffic to the security service agent, the redirecting in response to the evaluating, wherein the memory further to store a set of one or more policies to determine at least in part a change to the stored set of one or more traffic selectors,
        a selection manager to receive anomaly detection information, the selection manager further to trigger an update to the set of one or more policies based at least in part on the received anomaly detection information, the update including modifying a first policy according to which the set of traffic selectors is to be updated,
    the switch to selectively direct other data in the received network traffic without interruption during the update to the set of one or more policies; and
    a security service agent to receive the redirected data in the network traffic and to inspect the received redirected data in the network traffic for a security threat.

10. The apparatus of claim 9, wherein the set of one or more traffic selectors includes at least one of an identifier of a data service and an identifier of a data flow.

11. The apparatus of claim 9, wherein the security service agent is an intrusion prevention system.

12. The apparatus of claim 11, wherein the anomaly detection information is received from the intrusion prevention system.

13. The apparatus of claim 9, the switch further having a security rules engine including a set of rules to analyze the received traffic flow, the security rules engine to provide anomaly detection information to the mechanism.

14. The apparatus of claim 9, wherein the mechanism is to receive anomaly detection information using a data communication protocol.

15. The apparatus of claim 9, wherein updating the set of one or more policies includes rebooting a component of a modular operating system.

16. A system comprising:
    a switch having
        an interface to receive network traffic which is subject to a selective switching,
        a memory to store a set of one or more traffic selectors, each traffic selector in the set of traffic selectors indicating a respective data flow,
        traffic selection logic to evaluate a set of data in the received network traffic based on a first traffic selector in the set of traffic selectors, the evaluating to determine whether the set of data is to be inspected by a security service agent, the traffic selection logic further to redirect the set of data in the received network traffic to the security service agent, the redirecting in response to the evaluating, wherein the memory further to store a set of one or more policies to determine at least in part a change to the stored set of one or more traffic selectors,
        a selection manager to receive anomaly detection information, the selection manager further to trigger an update to the set of one or more policies based at least in part on the received anomaly detection information, the update including modifying a first policy according to which the set of traffic selectors is to be updated,
    the switch to selectively direct other data in the received network traffic without interruption during the update to the set of one or more policies;

a security service agent to receive the redirected data in the network traffic and to inspect the received redirected data in the network traffic for a security threat; and a twisted pair cable connecting the switch and the security service agent.

17. The system of claim 16, wherein the set of one or more traffic selectors includes at least one of an identifier of a data service and an identifier of a data flow.

18. The system of claim 16, wherein the security service agent is an intrusion prevention system.

19. The system of claim 18, wherein the anomaly detection information is received from the intrusion prevention system.

20. The system of claim 16, the switch further having a security rules engine including a set of rules to analyze the received traffic flow, the security rules engine to provide anomaly detection information to the mechanism.

21. The system of claim 16, wherein the mechanism is to receive anomaly detection information using a data communication protocol.

22. The system of claim 16, wherein modifying the set of one or more policies includes rebooting a component of a modular operating system.

23. A machine-readable medium that provides instructions, which when executed by a set of one or more processors, cause said set of processors to perform a method comprising:

receiving network traffic which is subject to a selective switching;

storing a set of one or more traffic selectors, each traffic selector in the set of one or more traffic selectors indicating a respective data flow;

evaluating a set of data in the received network traffic based on a first traffic selector in the set of one or more traffic selectors, the evaluating to determine whether the set of data is to be inspected by a security service agent;

in response to the evaluating, redirecting the set of data in the received network traffic to the security service agent;

detecting that a network condition exceeds a threshold of a set of one or more policies;

in response to the detecting, triggering an update of the set of one or more traffic selectors;

receiving anomaly detection information; and based on the received anomaly detection information, modifying in the set of one or more policies a first policy according to which the set of one or more traffic selectors is to be updated, the modifying without interrupting the selective switching of the network traffic.

24. The machine-readable medium of claim 23, wherein the set of one or more traffic selectors includes at least one of an identifier of a data service and an identifier of a data flow.

25. The machine-readable medium of claim 23, wherein the anomaly detection information is received from an agent other than the security service agent.

26. The machine-readable medium of claim 23, wherein the security service agent is an intrusion prevention system.

27. The machine-readable medium of claim 26, wherein the anomaly detection information is received from the intrusion prevention system.

28. The machine-readable medium of claim 23, further comprising analyzing the received traffic flow via a security rules engine, and wherein the anomaly detection information is received from the security rules engine.

29. The machine-readable medium of claim 23, wherein the anomaly detection is received via a data communication protocol.

30. The machine-readable medium of claim 23, wherein updating the set of one or more policies includes rebooting a component of a modular operating system.

* * * * *